(12) United States Patent
Uludag et al.

(10) Patent No.: US 7,899,217 B2
(45) Date of Patent: Mar. 1, 2011

(54) MULTIBIOMETRIC MULTISPECTRAL IMAGER

(75) Inventors: Umut Uludag, Albuquerque, NM (US); Robert K. Rowe, Corrales, NM (US); Kristin A. Nixon, Albuquerque, NM (US); Matthew S. Ennis, Cedar Crest, NM (US)

(73) Assignee: Lumidign, Inc., Albuquerque, NM (US)

(*) Notice: Subject to any disclaimer, the term of this patent is extended or adjusted under 35 U.S.C. 154(b) by 875 days.

(21) Appl. No.: 11/779,998

(22) Filed: Jul. 19, 2007

(65) Prior Publication Data
US 2008/0192988 A1    Aug. 14, 2008

Related U.S. Application Data

(60) Provisional application No. 60/832,233, filed on Jul. 19, 2006.

(51) Int. Cl.
*G06K 9/00* (2006.01)
(52) U.S. Cl. ........ 382/115; 382/116; 382/124; 340/5.53; 340/5.83
(58) Field of Classification Search .................. 382/115, 382/116, 124; 340/5.53, 5.83
See application file for complete search history.

(56) References Cited

U.S. PATENT DOCUMENTS

| | | | |
|---|---|---|---|
| 3,508,830 A | 4/1970 | Hopkins et al. | |
| 3,910,701 A | 10/1975 | Henderson et al. | |
| RE29,008 E | 10/1976 | Ott | |
| 4,035,083 A | 7/1977 | Woodriff et al. | |
| 4,142,797 A | 3/1979 | Astheimer | |
| 4,169,676 A | 10/1979 | Kaiser | |
| 4,170,987 A | 10/1979 | Anselmo et al. | |
| 4,260,220 A | 4/1981 | Whitehead | |
| 4,322,163 A | 3/1982 | Schiller | |
| 4,427,889 A | 1/1984 | Muller | |
| 4,537,484 A | 8/1985 | Fowler | |
| 4,598,715 A | 7/1986 | Machler et al. | |
| 4,653,880 A | 3/1987 | Sting et al. | |
| 4,654,530 A | 3/1987 | Dybwad | |
| 4,655,225 A | 4/1987 | Dahne et al. | |
| 4,656,562 A | 4/1987 | Sugino | |
| 4,657,397 A | 4/1987 | Oehler et al. | |
| 4,661,706 A | 4/1987 | Messerschmidt et al. | |
| 4,684,255 A | 8/1987 | Ford | |
| 4,699,149 A | 10/1987 | Rice | |
| 4,712,912 A | 12/1987 | Messerschmidt | |

(Continued)

FOREIGN PATENT DOCUMENTS

DE    10153808    5/2003

(Continued)

OTHER PUBLICATIONS

Anderson, C. E. et al., "Fundamentals of Calibration Transfer Through Procrustes Analysis," Appln. Spectros., vol. 53, No. 10 (1999) p. 1268-1276.

(Continued)

*Primary Examiner* — John B Strege
(74) *Attorney, Agent, or Firm* — Kilpatrick Townsend & Stockton LLP

(57) ABSTRACT

A skin site of an individual is illuminated and light scattered from the skin site under multispectral conditions is received. The light includes light scattered from tissue beneath a surface of the skin site. Multiple biometric modalities are derived from the received light. The biometric modalities are fused into a combined biometric modality that is analyzed to perform a biometric function.

28 Claims, 10 Drawing Sheets

U.S. PATENT DOCUMENTS

| | | |
|---|---|---|
| 4,730,882 A | 3/1988 | Messerschmidt |
| 4,747,147 A | 5/1988 | Sparrow |
| 4,787,013 A | 11/1988 | Sugino et al. |
| 4,787,708 A | 11/1988 | Whitehead |
| 4,830,496 A | 5/1989 | Young |
| 4,853,542 A | 8/1989 | Milosevic et al. |
| 4,857,735 A | 8/1989 | Noller |
| 4,859,064 A | 8/1989 | Messerschmidt et al. |
| 4,866,644 A | 9/1989 | Shenk et al. |
| 4,867,557 A | 9/1989 | Takatani et al. |
| 4,882,492 A | 11/1989 | Schlager |
| 4,883,953 A | 11/1989 | Koashi et al. |
| 4,936,680 A | 6/1990 | Henkes et al. |
| 4,944,021 A | 7/1990 | Hoshino et al. |
| 4,975,581 A | 12/1990 | Robinson et al. |
| 5,015,100 A | 5/1991 | Doyle |
| 5,019,715 A | 5/1991 | Sting et al. |
| 5,028,787 A | 7/1991 | Rosenthal et al. |
| 5,051,602 A | 9/1991 | Sting et al. |
| 5,068,536 A | 11/1991 | Rosenthal |
| 5,070,874 A | 12/1991 | Barnes et al. |
| 5,077,803 A | 12/1991 | Kato et al. |
| 5,088,817 A * | 2/1992 | Igaki et al. ............ 356/71 |
| 5,109,428 A | 4/1992 | Igaki et al. |
| 5,146,102 A | 9/1992 | Higuchi et al. |
| 5,158,082 A | 10/1992 | Jones |
| 5,163,094 A | 11/1992 | Prokoski et al. |
| 5,177,802 A | 1/1993 | Jfujimoto et al. |
| 5,178,142 A | 1/1993 | Harjunmaa et al. |
| 5,179,951 A | 1/1993 | Knudson |
| 5,204,532 A | 4/1993 | Rosenthal |
| 5,222,495 A | 6/1993 | Clarke et al. |
| 5,222,496 A | 6/1993 | Clarke et al. |
| 5,223,715 A | 6/1993 | Taylor |
| 5,225,678 A | 7/1993 | Messerschmidt |
| 5,230,702 A | 7/1993 | Lindsay et al. |
| 5,237,178 A | 8/1993 | Rosenthal et al. |
| 5,243,546 A | 9/1993 | Maggard |
| 5,257,086 A | 10/1993 | Fateley et al. |
| 5,258,922 A | 11/1993 | Grill |
| 5,267,152 A | 11/1993 | Yang et al. |
| 5,268,749 A | 12/1993 | Weber et al. |
| 5,291,560 A | 3/1994 | Daugman |
| 5,299,570 A | 4/1994 | Hatschek |
| 5,303,026 A | 4/1994 | Strobl et al. |
| 5,311,021 A | 5/1994 | Messerschmidt |
| 5,313,941 A | 5/1994 | Braig et al. |
| 5,321,265 A | 6/1994 | Block |
| 5,331,958 A | 7/1994 | Oppenheimer |
| 5,348,003 A | 9/1994 | Caro |
| 5,351,686 A | 10/1994 | Steuer et al. |
| 5,355,880 A | 10/1994 | Thomas et al. |
| 5,360,004 A | 11/1994 | Purdy et al. |
| 5,361,758 A | 11/1994 | Hall et al. |
| 5,366,903 A | 11/1994 | Lundsgaard et al. |
| 5,372,135 A | 12/1994 | Mendelson et al. |
| 5,379,764 A | 1/1995 | Barnes et al. |
| 5,402,778 A | 4/1995 | Chance |
| 5,405,315 A | 4/1995 | Khuri et al. |
| 5,413,098 A | 5/1995 | Benaron et al. |
| 5,419,321 A | 5/1995 | Evans |
| 5,435,309 A | 7/1995 | Thomas et al. |
| 5,441,053 A | 8/1995 | Lodder et al. |
| 5,452,723 A | 9/1995 | Wu et al. |
| 5,459,317 A | 10/1995 | Small et al. |
| 5,459,677 A | 10/1995 | Kowalski et al. |
| 5,460,177 A | 10/1995 | Purdy et al. |
| 5,483,335 A | 1/1996 | Tobias |
| 5,494,032 A | 2/1996 | Robinson et al. |
| 5,505,726 A | 4/1996 | Meserol |
| 5,507,723 A | 4/1996 | Keshaviah |
| 5,515,847 A | 5/1996 | Braig et al. |
| 5,518,623 A | 5/1996 | Keshaviah et al. |
| 5,523,054 A | 6/1996 | Switalski et al. |
| 5,533,509 A | 7/1996 | Koashi et al. |
| 5,537,208 A | 7/1996 | Bertram et al. |
| 5,539,207 A | 7/1996 | Wong et al. |
| 5,552,997 A | 9/1996 | Massart |
| 5,559,504 A | 9/1996 | Itsumi et al. |
| 5,568,251 A | 10/1996 | Davies et al. |
| 5,596,992 A | 1/1997 | Haaland et al. |
| 5,606,164 A | 2/1997 | Price et al. |
| 5,613,014 A | 3/1997 | Eshera et al. |
| 5,630,413 A | 5/1997 | Thomas et al. |
| 5,636,633 A | 6/1997 | Messerschmidt et al. |
| 5,655,530 A | 8/1997 | Messerschmidt |
| 5,672,864 A | 9/1997 | Kaplan |
| 5,672,875 A | 9/1997 | Block et al. |
| 5,677,762 A | 10/1997 | Ortyn et al. |
| 5,681,273 A | 10/1997 | Brown |
| 5,708,593 A | 1/1998 | Saby et al. |
| 5,719,399 A | 2/1998 | Alfano et al. |
| 5,719,950 A | 2/1998 | Osten et al. |
| 5,724,268 A | 3/1998 | Sodickson et al. |
| 5,737,439 A | 4/1998 | Lapsley et al. |
| 5,743,262 A | 4/1998 | Lepper, Jr. et al. |
| 5,747,806 A | 5/1998 | Khalil |
| 5,750,994 A | 5/1998 | Schlager |
| 5,751,835 A | 5/1998 | Topping et al. |
| 5,761,330 A | 6/1998 | Stoianov et al. |
| 5,782,755 A | 7/1998 | Chance et al. |
| 5,792,050 A | 8/1998 | Alam et al. |
| 5,792,053 A | 8/1998 | Skladner et al. |
| 5,793,881 A | 8/1998 | Stiver et al. |
| 5,796,858 A | 8/1998 | Zhou et al. |
| 5,808,739 A | 9/1998 | Turner et al. |
| 5,818,048 A | 10/1998 | Sodickson et al. |
| 5,823,951 A | 10/1998 | Messerschmidt et al. |
| 5,828,066 A | 10/1998 | Messerschmidt |
| 5,830,132 A | 11/1998 | Robinson |
| 5,830,133 A | 11/1998 | Osten et al. |
| 5,850,623 A | 12/1998 | Carman, Jr. et al. |
| 5,853,370 A | 12/1998 | Chance et al. |
| 5,857,462 A | 1/1999 | Thomas et al. |
| 5,860,421 A | 1/1999 | Eppstein et al. |
| 5,867,265 A | 2/1999 | Thomas |
| 5,886,347 A | 3/1999 | Inoue et al. |
| 5,902,033 A | 5/1999 | Levis et al. |
| 5,914,780 A | 6/1999 | Turner et al. |
| 5,929,443 A | 7/1999 | Alfano et al. |
| 5,933,792 A | 8/1999 | Anderson et al. |
| 5,935,062 A | 8/1999 | Messerschmidt et al. |
| 5,945,676 A | 8/1999 | Khalil |
| 5,949,543 A | 9/1999 | Bleier et al. |
| 5,957,841 A | 9/1999 | Maruo et al. |
| 5,961,449 A | 10/1999 | Toida et al. |
| 5,963,319 A | 10/1999 | Jarvis et al. |
| 5,987,346 A | 11/1999 | Benaron et al. |
| 5,999,637 A | 12/1999 | Toyoda et al. |
| 6,005,722 A | 12/1999 | Butterworth et al. |
| 6,016,435 A | 1/2000 | Maruo et al. |
| 6,025,597 A | 2/2000 | Sterling et al. |
| 6,026,314 A | 2/2000 | Amerov et al. |
| 6,028,773 A | 2/2000 | Hundt |
| 6,031,609 A | 2/2000 | Funk et al. |
| 6,034,370 A | 3/2000 | Messerschmidt |
| 6,040,578 A | 3/2000 | Malin et al. |
| 6,041,247 A | 3/2000 | Weckstrom et al. |
| 6,041,410 A | 3/2000 | Hsu et al. |
| 6,043,492 A | 3/2000 | Lee et al. |
| 6,044,285 A | 3/2000 | Chaiken et al. |
| 6,045,502 A | 4/2000 | Eppstein et al. |
| 6,046,808 A | 4/2000 | Fately |
| 6,049,727 A | 4/2000 | Crothall |
| 6,056,738 A | 5/2000 | Marchitto et al. |
| 6,057,925 A | 5/2000 | Anthon |
| 6,061,581 A | 5/2000 | Alam et al. |
| 6,061,582 A | 5/2000 | Small et al. |
| 6,066,847 A | 5/2000 | Rosenthal |
| 6,069,689 A | 5/2000 | Zeng et al. |
| 6,070,093 A | 5/2000 | Oosta et al. |
| 6,073,037 A | 6/2000 | Alam et al. |
| 6,088,605 A | 7/2000 | Griffith et al. |
| 6,088,607 A | 7/2000 | Diab et al. |
| 6,097,035 A | 8/2000 | Belongie et al. |
| 6,100,811 A | 8/2000 | Hsu et al. |
| 6,115,484 A | 9/2000 | Bowker et al. |

| Patent No. | Date | Inventor |
|---|---|---|
| 6,115,673 A | 9/2000 | Malin et al. |
| 6,122,042 A | 9/2000 | Wunderman et al. |
| 6,122,394 A | 9/2000 | Neukermans et al. |
| 6,122,737 A | 9/2000 | Bjorn et al. |
| 6,125,192 A | 9/2000 | Bjorn et al. |
| 6,141,101 A | 10/2000 | Bleier et al. |
| 6,147,749 A | 11/2000 | Kubo et al. |
| 6,148,094 A | 11/2000 | Kinsella |
| 6,152,876 A | 11/2000 | Robinson et al. |
| 6,154,658 A | 11/2000 | Caci |
| 6,157,041 A | 12/2000 | Thomas et al. |
| 6,159,147 A | 12/2000 | Lichter et al. |
| 6,172,743 B1 | 1/2001 | Kley et al. |
| 6,175,407 B1 | 1/2001 | Sartor |
| 6,181,414 B1 | 1/2001 | Raz et al. |
| 6,181,958 B1 | 1/2001 | Steuer et al. |
| 6,188,781 B1 | 2/2001 | Brownlee |
| 6,208,749 B1 | 3/2001 | Gutkowicz-Krusin |
| 6,212,424 B1 | 4/2001 | Robinson |
| 6,226,541 B1 | 5/2001 | Eppstein et al. |
| 6,230,034 B1 | 5/2001 | Messerschmidt et al. |
| 6,240,306 B1 | 5/2001 | Rohrscheib et al. |
| 6,240,309 B1 | 5/2001 | Yamashita et al. |
| 6,241,663 B1 | 6/2001 | Wu et al. |
| 6,256,523 B1 | 7/2001 | Diab et al. |
| 6,272,367 B1 | 8/2001 | Chance |
| 6,280,381 B1 | 8/2001 | Malin et al. |
| 6,282,303 B1 | 8/2001 | Brownlee |
| 6,285,895 B1 | 9/2001 | Ristolainen et al. |
| 6,292,576 B1 | 9/2001 | Brownlee |
| 6,301,375 B1 | 10/2001 | Choi |
| 6,301,815 B1 | 10/2001 | Sliwa |
| 6,304,767 B1 | 10/2001 | Soller et al. |
| 6,307,633 B1 | 10/2001 | Mandella et al. |
| 6,309,884 B1 | 10/2001 | Cooper et al. |
| 6,317,507 B1 | 11/2001 | Dolfing et al. |
| 6,324,310 B1 | 11/2001 | Brownlee |
| 6,330,346 B1 | 12/2001 | Peterson et al. |
| 6,404,904 B1 | 6/2002 | Einighammer et al. |
| 6,419,361 B2 | 7/2002 | Cabib et al. |
| 6,483,929 B1 | 11/2002 | Murakami et al. |
| 6,504,614 B1 | 1/2003 | Messerschmidt et al. |
| 6,537,225 B1 | 3/2003 | Mills |
| 6,560,352 B2 | 5/2003 | Rowe et al. |
| 6,574,490 B2 | 6/2003 | Abbink et al. |
| 6,606,509 B2 | 8/2003 | Schmitt |
| 6,628,809 B1 | 9/2003 | Rowe et al. |
| 6,631,199 B1 | 10/2003 | Topping et al. |
| 6,741,729 B2 | 5/2004 | Bjorn et al. |
| 6,799,275 B1 | 9/2004 | Bjorn |
| 6,816,605 B2 | 11/2004 | Rowe et al. |
| 6,825,930 B2 | 11/2004 | Cronin et al. |
| 6,928,181 B2 | 8/2005 | Brooks |
| 6,937,885 B1 | 8/2005 | Lewis et al. |
| 6,958,194 B1 | 10/2005 | Hopper et al. |
| 7,047,419 B2 * | 5/2006 | Black .......................... 713/186 |
| 7,147,153 B2 | 12/2006 | Rowe et al. |
| 7,287,013 B2 * | 10/2007 | Schneider et al. .............. 706/15 |
| 2002/0009213 A1 | 1/2002 | Rowe et al. |
| 2002/0101566 A1 | 8/2002 | Elsner et al. |
| 2002/0171834 A1 | 11/2002 | Rowe et al. |
| 2002/0183624 A1 | 12/2002 | Rowe et al. |
| 2003/0044051 A1 | 3/2003 | Fujieda |
| 2003/0078504 A1 | 4/2003 | Rowe |
| 2003/0163710 A1 | 8/2003 | Ortiz et al. |
| 2003/0223621 A1 | 12/2003 | Rowe et al. |
| 2004/0008875 A1 | 1/2004 | Linares |
| 2004/0047493 A1 | 3/2004 | Rowe et al. |
| 2004/0114783 A1 | 6/2004 | Spycher et al. |
| 2004/0179722 A1 | 9/2004 | Moritoki et al. |
| 2004/0240712 A1 | 12/2004 | Rowe et al. |
| 2004/0264742 A1 * | 12/2004 | Zhang et al. ................... 382/115 |
| 2005/0007582 A1 | 1/2005 | Villers et al. |
| 2005/0180620 A1 | 8/2005 | Takiguchi |
| 2005/0185847 A1 | 8/2005 | Rowe |
| 2005/0205667 A1 | 9/2005 | Rowe |
| 2005/0265585 A1 | 12/2005 | Rowe |
| 2005/0265586 A1 | 12/2005 | Rowe et al. |
| 2005/0265607 A1 | 12/2005 | Chang |
| 2005/0271258 A1 | 12/2005 | Rowe |
| 2006/0002597 A1 | 1/2006 | Rowe |
| 2006/0002598 A1 | 1/2006 | Rowe et al. |
| 2006/0110015 A1 | 5/2006 | Rowe |
| 2006/0115128 A1 | 6/2006 | Mainguet |
| 2006/0171571 A1 * | 8/2006 | Chan et al. ..................... 382/115 |
| 2006/0202028 A1 | 9/2006 | Rowe |
| 2006/0210120 A1 | 9/2006 | Rowe |
| 2006/0274921 A1 | 12/2006 | Rowe |

FOREIGN PATENT DOCUMENTS

| | | |
|---|---|---|
| EP | 0 280 418 A1 | 8/1988 |
| EP | 0 372 748 | 6/1990 |
| EP | 0 897 164 A2 | 2/1999 |
| EP | 0 924 656 A2 | 6/1999 |
| EP | 1 353 292 | 10/2003 |
| EP | 1 434 162 A2 | 6/2004 |
| FR | 2761180 A1 | 9/1998 |
| JP | 2001-184490 A | 7/2001 |
| JP | 2002-133402 A | 5/2002 |
| JP | 2003-308520 A | 10/2003 |
| WO | WO 92/00513 A1 | 1/1992 |
| WO | WO 92/17765 A1 | 10/1992 |
| WO | WO 93/07801 A1 | 4/1993 |
| WO | WO 01/18332 A1 | 3/2001 |
| WO | WO 01/27882 A2 | 4/2001 |
| WO | WO 01/52180 A1 | 7/2001 |
| WO | WO 01/52726 A1 | 7/2001 |
| WO | WO 01/53805 A1 | 7/2001 |
| WO | WO 02/084605 A2 | 10/2002 |
| WO | WO 02/099393 A2 | 12/2002 |
| WO | WO 03/096272 A1 | 11/2003 |
| WO | WO 2004/068388 A2 | 8/2004 |
| WO | WO 2004/068394 | 8/2004 |
| WO | WO 2004/068394 A1 | 8/2004 |
| WO | WO 2004/090786 | 10/2004 |

OTHER PUBLICATIONS

Ashbourn, Julian, Biometrics; Advanced Identity Verification, Springer, 2000, pp. 63-64).

Bantle, John P. et al., "Glucose Measurement In Patients With Diabetes Mellitus With Dermal Interstitial Fluid," Mosby-Year Book, Inc., 9 pages, 1997.

Berkoben, Michael S. et al., "Vascular Access for Hemodialysis," Clinical Dialysis, Third Edition, pp. 2 cover pages and 26-45, 1995.

Blank, T.B. et al., "Transfer of Near-Infrared Multivariate Calibrations Without Standards," Anal. Chem., vol. 68 (1996) p. 2987.

Bleyer, Anthony J. et al., "The Costs Of Hospitalizations Due To Hemodialysis Access Management," Nephrology News & Issues, pp. 19, 20 and 22, Jan. 1995.

Brasunas John C. et al., "Uniform Time-Sampling Fourier Transform Spectroscopy," Applied Optics, vol. 36, No. 10, Apr. 1, 1997, pp. 2206-22 10.

Brault, James W., "New Approach to High-Precision Fourier Transform Spectrometer Design," Applied Optics, Vo. 35, No. 16, Jun. 1, 1996, pp. 2891-2896.

Brochure entitled "Improve the Clinical Outcome of Every Patient", In Line Diagnostics, published on or before Oct. 30, 1997, 2 pages.

Cassarly, W.J. et al., "Distributed Lighting Systems: Uniform Light Delivery," Source Unknown, pp. 1698-1702, 1995.

Chang, Chong-Min et al., "An Uniform Rectangular Illuminating Optical System for Liquid Crystal Light Valve Projectors," Euro Display '96 (1996) pp. 257-260.

Coyne, Lawrence J. et al., "Distributive Fiber Optic couplers Using Rectangular Lightguides as Mixing Elements," (Information Gatekeepers, Inc. Brookline, MA, 1979) pp. 160-164.

Daugirdas, JT et al., "Comparison of Methods to Predict the Equilibrated Kt/V (eKt/V) In The Hemo Study," National Institutes of Health, pp. 1-28, Aug. 20, 1996.

de Noord, Onno E., "Multivariate Calibration Standardization," Chemometrics and intelligent Laboratory Systems 25, (1994) pp. 85-97.

Demos, S. G. et al., "Optical Fingerprinting Using Polarisation Contrast Improvement," Electronics Letters, vol. 33, No. 7, pp. 582-584, Mar. 27, 1997.

Depner, Thomas A. et al., "Clinical Measurement Of Blood Flow In Hemodialysis Access Fistulae And Grafts By Ultrasound Dilution," Division of Nephrology, University of California, pp. M745-M748, published on or before Oct. 30, 1997.

Despain, Alvin M. et al., "A Large-Aperture Field-Widened Interferometer-Spectrometer for Airglow Studies," Aspen International Conference on Fourier Spectroscopy, 1970, pp. 293-300.

Faber, Nicolaas, "Multivariate Sensitivity for the Interpretation of the Effect of Spectral Pretreatment Methods on Near-Infrared Calibration Model Predictions," Analytical Chemistry, vol. 71, No. 3, Feb. 1, 1999, pp. 557-565.

Fresenius USA, "Determination Of Delivered Therapy Through Measurement Of Effective Clearance," 2 pages, Dec. 1994.

Geladi, Paul et al., A Multivariate NIR Study of Skin Alterations in Diabetic Patients as Compared to Control Subjects, J. Near Infrared Spectrosc., vol. 8 (2000) pp. 217-227.

Hakim, Raymond M. et al., "Effects Of Dose Of Dialysis On Morbidity And Mortality," American Journal of Kidney Diseases, vol. 23, No. 5, pp. 661-669, May 1994.

Jacobs, Paul et al., "A Disposable Urea Sensor For Continuous Monitoring Of Hemodialysis Efficiency," ASAIO Journal, pp. M353-M358, 1993.

Keshaviah, Prakash R. et al., "On-Line Monitoring Of The Delivery Of The Hemodialysis Prescription," Pediatric Nephrology, vol. 9, pp. S2-S8, 1995.

Krivitski, Nikolai M., "Theory And Validation Of Access Flow Measurement By Dilution Technique During Hemodialysis," Kidney International, vol. 48, pp. 244-250, 1995.

Lee et al., "Fingerprint Recognition Using Principal Gabor Basis Function", Proceedings of 2001 International Symposium on Intelligent Multimedia, Video and Speech Processing, May 2-4, 2001, Sections 2-3.

Marbach, Ralf, "Measurement Techniques For IR Spectroscopic Blood Glucose Determination," Fortschritt Bericht, Series 8: Measurement And Control Technology, No. 346, pp. cover and 1-158, Mar. 28, 1994.

Mardia, K.V. et al., "Chapter 11—Discriminant Analysis," Multivariate Analysis, pp. 2 cover pages and 300-325, 1979.

Nichols, Michael G. et al., "Design And Testing Of A White-Light, Steady-State Diffuse Reflectance Spectrometer For Determination Of Optical Properties Of Highly Scattering Systems," Applied Optics, vol. 36, No. 1, pp. 93-104, Jan. 1, 1997.

Nixon, Kristin A. et al., "Novel Spectroscopy-Based Technology for Biometric and Liveness Verification", Technology for Human Identification. Proceedings od SPIE, vol. 5404, No. 1, XP-002458441, Apr. 12-13, 2004, pp. 287-295 (ISSN: 0277-786x).

Pan et al., "Face Recognition in Hyperspectral Images", IEEE Transactions on Pattern Analysis and Machine Inteliigence, vol. 25, No. 12, Dec. 2003.

Ripley, B. D., "Chapter 3—Linear Discriminant Analysis," Pattern Recognition and Neural Networks, pp. 3 cover pages and 91-120, 1996.

Ronco, C. et al., "On-Line Urea Monitoring : A Further Step Towards Adequate Dialysis Prescription And Delivery," The International Journal of Artificial Organs, vol. 18, No. 9, pp. 534-543, 1995.

Ross et al., "A Hybrid Fingerprint Matcher," Pattern Recognition 36, The Journal of the Pattern Recognition Society, 2003 Elsevier Science Ltd., pp. 1661-1673.

Selvaraj et al., Fingerprint Verification Using Wavelet Transform, Proceedings of the Fifth International Conference on Computational Intelligence and Multimedia Applications, IEEE, 2003.

Service, F. John et al., "Dermal Interstitial Glucose As An Indicator Of Ambient Glycemia," Diabetes Care, vol. 20, No. 9, 8 pages, Aug. 1997.

Sherman, Richard A., "Chapter 4—Recirculation In The Hemodialysis Access," Principles and Practice of Dialysis, pp. 2 cover pages and 38-46, 1994.

Sherman, Richard A., "The Measurement Of Dialysis Access Recirculation," American Journal of Kidney Diseases, vol. 22, No. 4, pp. 616-621, Oct. 1993.

Steuer, Robert R. et al., "A New Optical Technique For Monitoring Hematocrit And Circulating Blood Volume: Its Application In Renal Dialysis," Dialysis & Transplantation, vol. 22, No. 5, pp. 260-265, May 1993.

Webb, Paul, "Temperatures Of Skin, Subcutaneous Tissue, Muscle And Core In Resting Men In Cold, Comfortable And Hot Conditions," European Journal of Applied Physiology, vol. 64, pp. 471-476, 1992.

Zavala, Albert et al., "Using Fingerprint Measures To Predict Other Anthropometric Variables," Human Factors, vol. 17, No. 6, pp. 591-602, 1975.

* cited by examiner

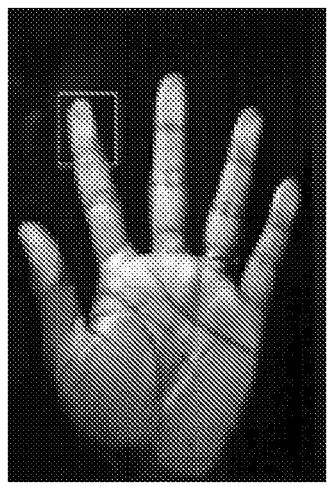 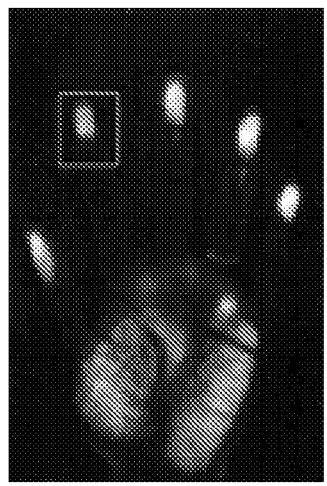 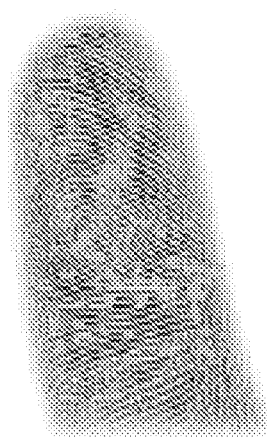
Fig. 8A    Fig. 8B    Fig. 8C
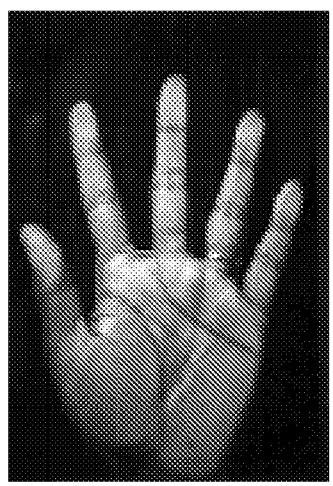 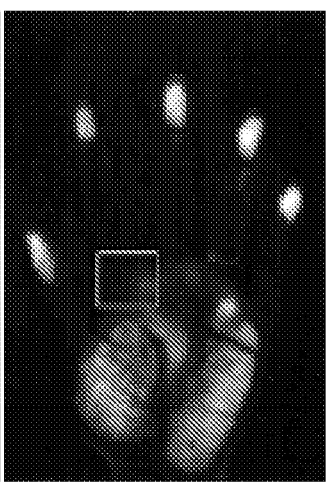 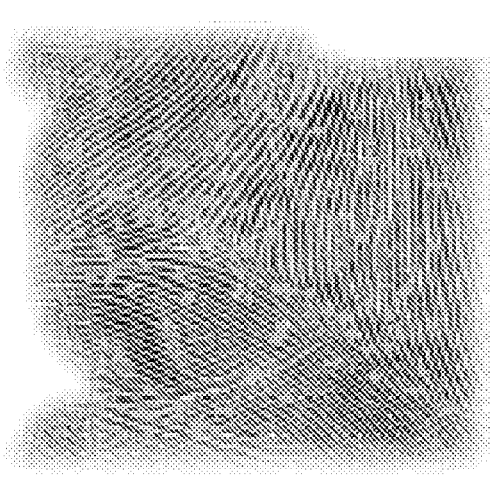
Fig. 9A    Fig. 9B    Fig. 9C

Fig. 13A    Fig. 13B    Fig. 13C
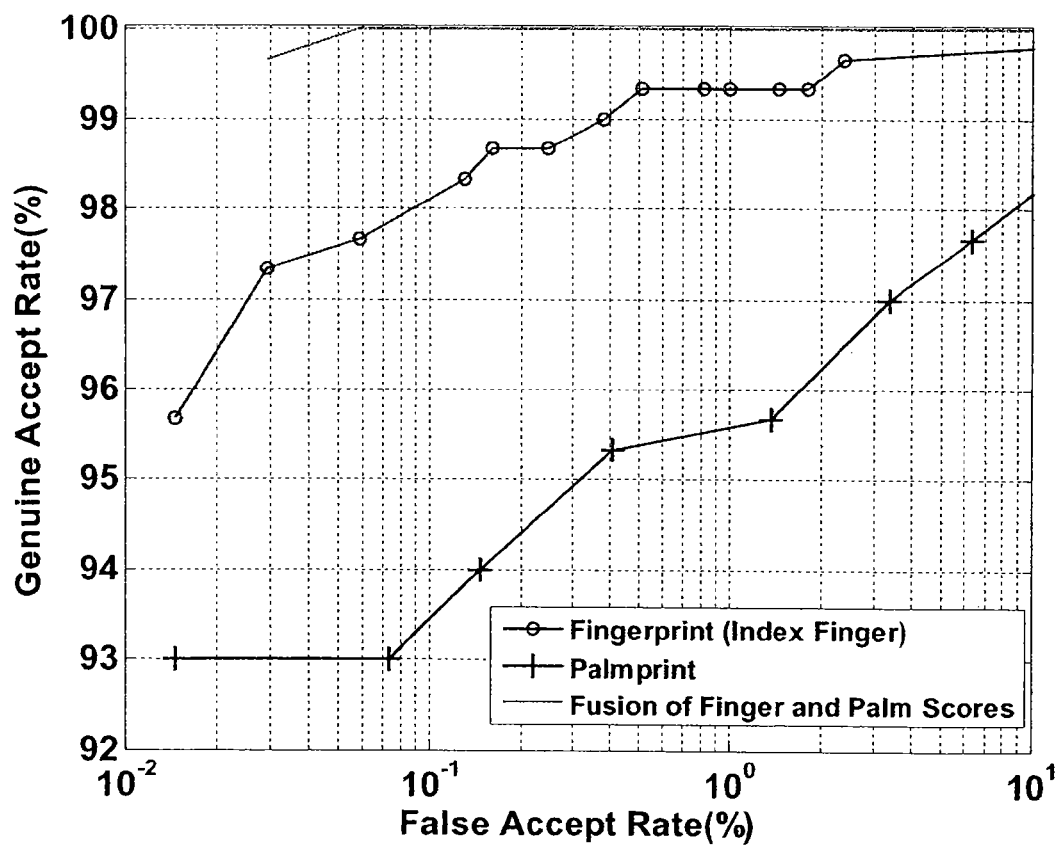
Fig. 14

MULTIBIOMETRIC MULTISPECTRAL IMAGER

CROSS REFERENCE TO RELATED APPLICATION

This application is a nonprovisional of, and claims the benefit of the filing date of, U.S. Provisional Patent Application No. 60/832,233, entitled "WHOLE-HAND MULTISPECTRAL IMAGER," filed Jul. 19, 2006 by Umut Uludag et al., the entire disclosure of which is incorporated herein by reference for all purposes.

STATEMENT AS TO RIGHTS TO INVENTIONS MADE UNDER FEDERALLY SPONSORED RESEARCH OR DEVELOPMENT

The United States Government may have rights in portions of the invention pursuant to support received from the United States Army under a Phase I SBIR, Contract No. W911NF-07-C-00022.

BACKGROUND OF THE INVENTION

This application relates generally to biometrics. More specifically, this application relates to multibiometric measurements that use spectral information.

There is a general trend toward developing and deploying multibiometric systems, which combine the information from two or more distinct sources of biometric signals in order to make a determination of identity. Such systems have significant performance advantages relative to unibiometric sensors. In particular, multibiometric systems are generally thought to provide higher absolute levels of accuracy, be more robust to sampling and environmental conditions, and are generally harder to defraud or spoof.

However, typical multibiometric systems combine multiple sensors such as a camera for facial imaging, a sensor for iris detection, and/or a sensor for fingerprint capture. Due to this, typical multibiometric systems are generally expensive, difficult to deploy, and require users to take multiple discrete actions in order to successfully interact with the biometric system.

There is accordingly the need for a multibiometric sensor that can provide high security while being cost-effective to build, simple to deploy, and easy for the user to interact with.

BRIEF SUMMARY OF THE INVENTION

Embodiments of the invention provide methods and systems that may be used in performing biometric functions. Methods of the invention comprise illuminating a skin site of an individual and receiving light scattered from the skin site under multispectral conditions, the light including light scattered from tissue beneath a surface of the skin site. A plurality of biometric modalities are derived from the received light. The plurality of biometric modalities are fused into a combined biometric modality. The combined biometric modality is analyzed to perform the biometric function.

The skin site may sometimes comprise a hand of the individual. For example, in one embodiment, the skin site comprises a palm of the hand and at least one fingertip of the hand. There are also a variety of biometric modalities that may be used, including a palmprint of the hand, a fingerprint of a finger of the hand, a shape of the hand, and/or a chromatic texture of the hand. The plurality of biometric modalities may be derived by converting raw color image data into a grayscale image that is then segmented into foreground and background portions. A fingertip of the hand may then be localized by generating a one-dimensional projection of the segmented grayscale image.

In some instances, the skin site is illuminated and the scattered light is received while the skin site is in at least partial contact with a platen.

The combined biometric modality may be analyzed in different embodiments to perform a number of different kinds of biometric function. For example, it may be analyzed to determine an identity of an individual or to verify the identity of the individual. It may be analyzed to verify that the hand is living tissue. In other instances, it is analyzed to estimate a demographic or anthropometric characteristic of the individual. In some embodiments, the skin site is illuminated with light polarized with a first polarization and the light scattered from the skin site is polarized with a second polarization, the first and second polarizations being substantially crossed relative to each other.

Methods of the invention may also be embodied in a biometric sensor that comprises an illumination subsystem, a detection subsystem, and a controller. The illumination subsystem is disposed to illuminate the skin site of the individual and the detection subsystem is disposed to receive the light scattered from the skin site. The controller includes instructions to implement the methods described above.

BRIEF DESCRIPTION OF THE DRAWINGS

A further understanding of the nature and advantages of the present invention may be realized by reference to the remaining portions of the specification and the drawings.

FIGS. 8A-8C show fingerprint images extracted from data in one implementation of the invention;

FIGS. 9A-9C show metacarpal feature extractions from data in one implementation of the invention;

FIGS. 13A-13C show ordinal features for different angles in the region of interest of FIG. 12; and FIG. 14 shows ROC curves for fusion of index finger and palm images in one implementation of the invention.

DETAILED DESCRIPTION OF THE INVENTION

Figure 1:
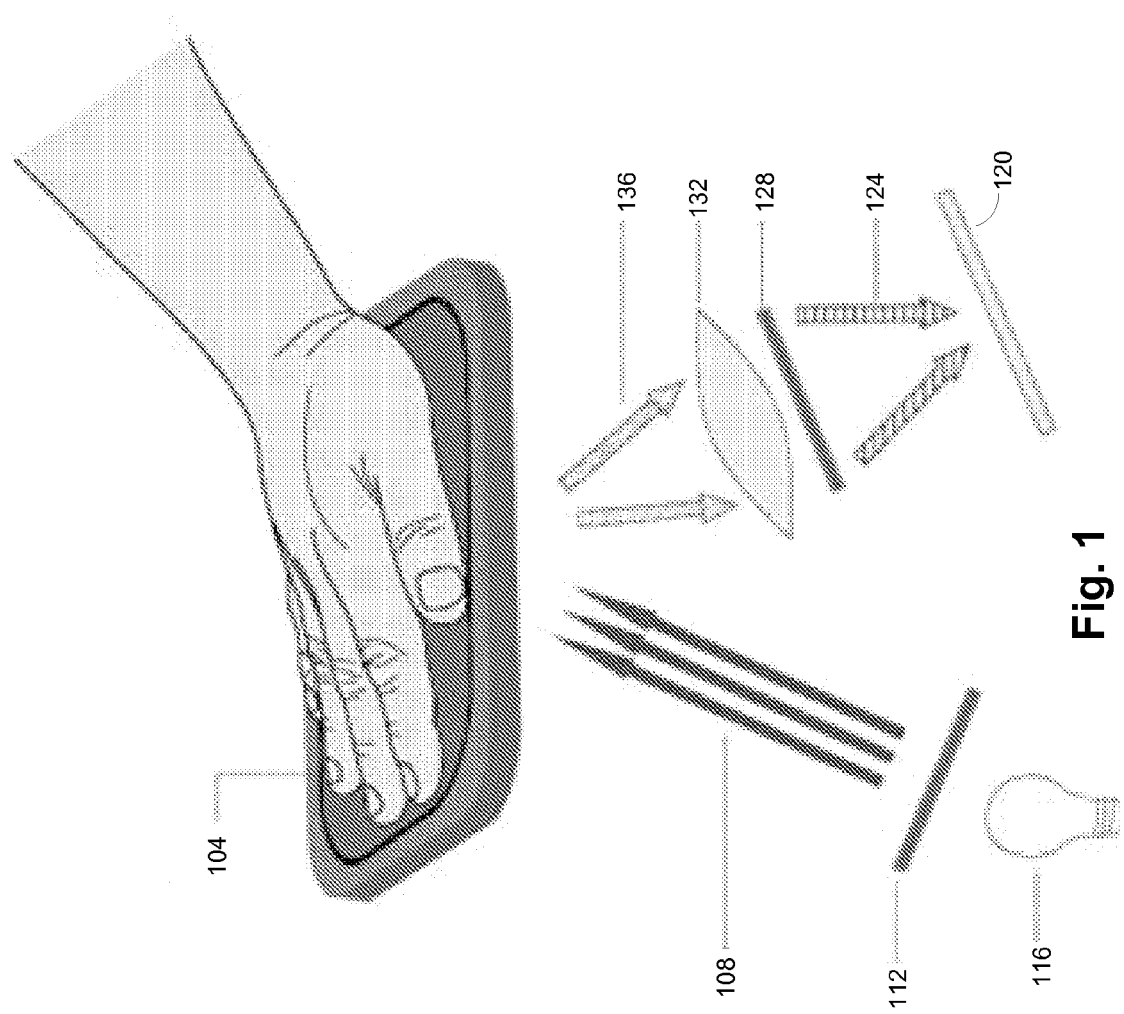
FIG. 1 provides a schematic of components and an arrangement of the whole-hand multispectral imager in an embodiment. This sensor can be configured to simultaneously collect five fingerprints, a palmprint, chromatic texture, and hand-shape, or any portion thereof.

Embodiments of the invention relate to systems and methods for collecting biometric data corresponding to multiple sources of biometric signals from a single skin site. In particular, aspects of the present invention are related to a multispectral imaging system that is capable of collecting multispectral data from the user's entire hand or a portion thereof. Such a whole hand scanner may collect biometric data related to at least four distinct sources: fingerprints (5), palmprint, chromatic texture, and handshape.

A common characteristic of the methods and systems of the present invention is the application of multiple distinct optical configurations used to collect a plurality of image data during a single illumination session. As used in this disclosure, "multispectral" refers to a set of optical measurements taken under a plurality of optical conditions. These plurality of optical conditions may include differences in illumination wavelength (both bandwidth and band location), differences in illumination angle (azimuth and elevation), differences in illumination polarization conditions, differences in illumination geometry (e.g. direct and total internal reflectance), differences in imaging angle (azimuth and elevation), differences in imaging geometry (e.g. direct and total internal reflectance), differences in imaging polarization filtering, and differences in imaging resolution and focus. The multispectral measurements may be derived from a single imaging sensor or multiple imaging sensors and the plurality of optical conditions may be measured simultaneously, sequentially, or in some other fashion.

Skin sites applicable to the multispectral measurements described herein include all surfaces and all joints of the fingers and thumbs, the fingernails and nail beds, the palms, the backs of the hands, the wrists and forearms, the face, the eyes including the irises, the ears, and all other external surfaces of the body. While the discussion below sometimes makes specific reference to "fingers" in providing examples of specific embodiments, it should be understood that these embodiments are merely exemplary and that other embodiments may use skin sites at other body parts. In particular, the term "fingerprints" includes both dermatoglyphic features found on proximal and distal phalanges of a finger as well as on other skin sites.

As used in this disclosure, "biometric modality" refers to a single biometric trait, characteristic, indicator, identifier or source of signal. A multibiometric system combines ("fuses") information from multiple biometric modalities in some way. For example, the modalities may be combined as raw data, as biometric features, as matching scores, or as a set of match/no-match decisions. The multiple biometric modalities may be derived from multiple sensors (e.g. face+voice, fingerprint+iris) or may be derived from a single sensor (e.g. face+iris, fingerprint+palm).

Chromatic texture refers to a measure of texture derived from the multispectral measurements made on a portion of the skin. For example, the dermatoglyphic features of the skin on the proximal phalanges of the fingers may be characterized as textures using some summary of wavelet coefficients, Fourier coefficients, laminar flow characteristics, points of flow discontinuities (i.e. minutiae), and/or other methods known in the art. Such characterizations may be derived separately from each of the optical conditions that comprise the multispectral data or may be derived from the multispectral data taken as a whole.

Biometric information collected from the whole-hand sensor can be used for a variety of biometric tasks including biometric matching (identification or verification), spoof and liveness detection, and/or estimation of demographic parameters including age, gender and ethnicity.

Biometric identification using multispectral data from a whole-hand sensor may be processed in a variety of ways. In one embodiment, each of the biometric sources of a signal may be separated from the others and compared separately to a corresponding biometric record on file. Such comparisons produce a match value (aka score) for each source of biometric signal. The individual scores may then be combined in some manner to produce a composite score, which is then evaluated to determine whether or not the sample matches the one on file. In other embodiments, the match of each biometric signal may be established separately, and the final determination of match may be done by combining the individual match/no-match results in some way. In still another embodiment, the data from the entire hand or portions thereof may be processed as a whole without explicitly separating the different sources of biometric signal.

FIG. 1 shows a schematic representation of the whole-hand multispectral sensor. The hand of an individual may rest on a platen 104, with illumination light provided with an illumination source 116. In some instances, the light may be polarized 108 by a polarizer 112 disposed between the illumination source 116 and the platen 104. Light scattered 136 from the hand is collected by an imagining array 120. The scattered light 136 may be imaged onto the array 120 by an imaging lens 132 and may be polarized by a polarizer 128 so that polarized light 124 is incident on the imaging array 120. In some embodiments, the polarizers 112 and 128 are provided in a crossed configuration so that any light that passes through the illumination polarizer 112 and undergoes a specular or surface reflection into the imaging system is substantially attenuated by the imaging polarizer 128. this arrangement them emphasizes light that has passed into the skin and been subjected to multiple optical scattering events before being imaged. In some embodiments, the system has multiple direct illumination LEDs that turn on sequentially. Some of the LEDs might not have polarizers in front of them, causing the hand to be illuminated with essentially randomly polarized light. Such an illumination state allows a greater portion of surface-reflected light to be imaged.

In addition to the polarized and unpolarized direct illumination LEDs, the system may also comprise an illumination state that uses light from LEDs that illuminate an edge of the platen. A portion of this light is trapped within the platen because of total-internal-reflectance ("TIR") phenomena and propagates through the platen. At points where the skin is in contact with the platen, the TIR effect is negated and light is able to enter the skin. Some of the light is diffusely reflected back out of the skin into the imaging system, producing an image of the contact regions.

While not shown in the embodiment of FIG. 1, some embodiments may include locating devices that provide weak or strong constraint on the position and/or configuration of the hand relative to the platen. Examples of such locating devices include pegs that may be disposed between individual fingers to provide a defined spacing of the fingers relative to each other. But such locating devices are not required in all embodiments of the invention and embodiments like that shown in FIG. 1 that have no such locating devices are within the intended scope of the invention.

In addition, various alternative embodiments of the structure shown in FIG. 1 may include mirrors, prisms, multiple cameras, and/or other optical mechanisms to provide different levels of information captured by the system. For instance, such optical elements may be configured to capture a larger or smaller portion of the thumb, greater or lesser fingerprint information, and so on.

Figure 2:
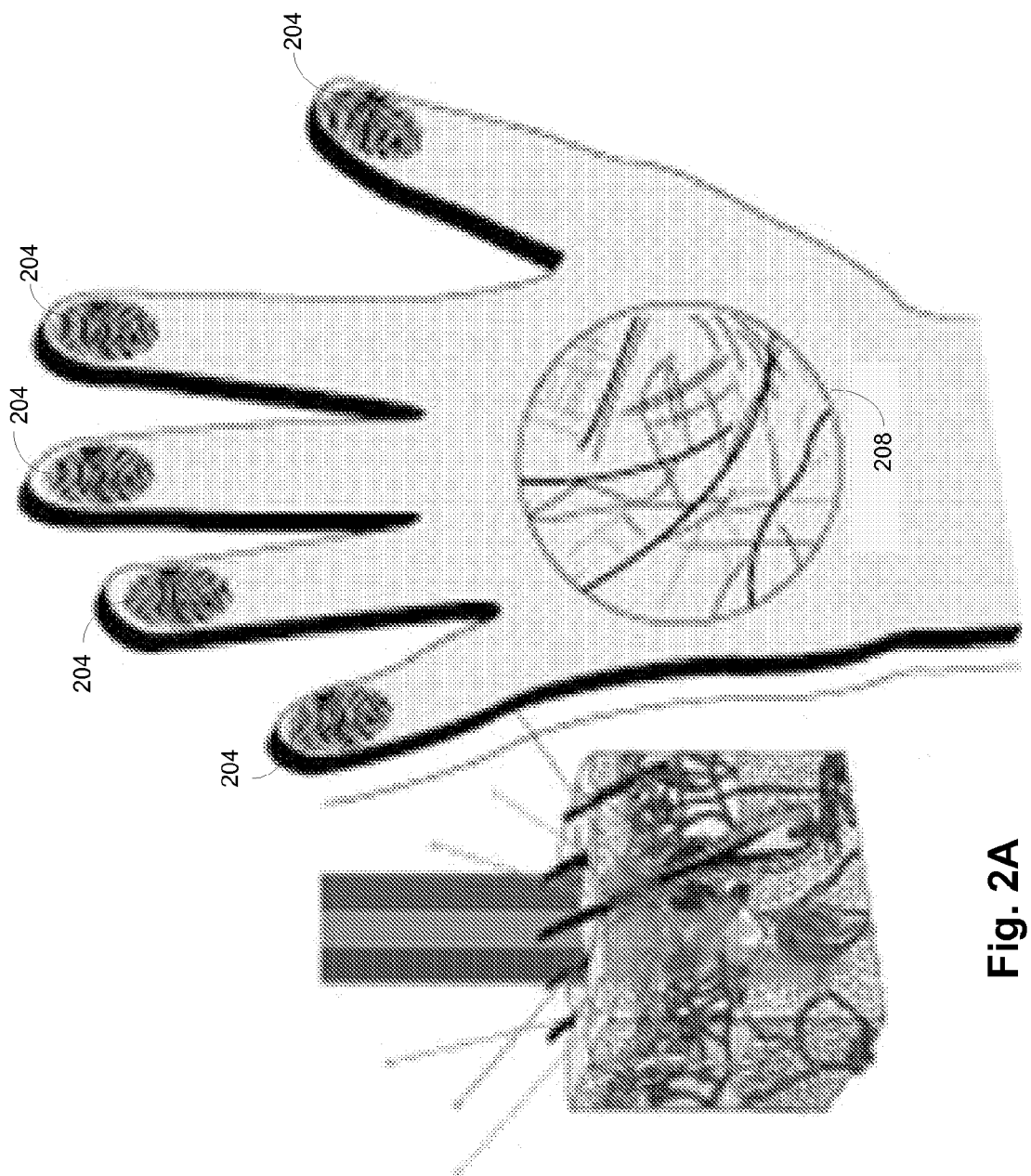
FIGS. 2A and 2B provide a graphic representation of four modalities that may be used in embodiments of the invention: five fingerprints, a palmprint, chromatic texture, and hand-shape.

FIGS. 2A and 2B provide graphic representations of the multiple biometric sources of signal. For example, FIG. 2A shows that chromatic texture may be used as one modality, as may the fingerprints 204, palmprint 208, and hand shape illustrated in FIG. 2B.

The whole-hand approach thus uses multispectral imaging to collect multiple modalities, with particular embodiments collecting four modalities: five fingerprints, a palmprint, handshape, and chromatic texture. In addition to being able to perform pattern matching on fingerprints, handshape, and palmprints in the usual way, certain embodiments use other observable optical properties of the skin to aid biometric determinations. Experiments and research conducted previously show that the structure and composition of skin is very complex. This complexity is due in part to the heterogeneous structure of the skin, which is composed of multiple layers. In the coarsest description of the layered skin structure, three layers are typically identified: the epidermis, dermis and subcutaneous, each with distinct physiological and optical properties. As well, skin contains portions of other physiological systems such as the smallest blood vessels of the circulatory system, the capillaries, which bring blood very close to the surface of the skin.

The sensor of the present invention incorporates a multispectral imager to measure the optical characteristics of the surface and subsurface skin. One part of the sensor is the light source, which may be a broad-band source such as an incandescent bulb, a white-light LED, a glowbar, or others of the sort. Alternatively, the light source may comprise multiple narrow-band sources such as LEDs, lasers and laser diodes, quantum dots, optically filtered sources and the like. In some cases, there may be multiple sources present in a sensor. In some cases, the illumination system may incorporate optical polarizers in such a way that the light from one or more sources is polarized before impinging on the hand. In some cases the polarizer may be a linear polarizer or a circular polarizer. In some embodiments, multiple light sources are illuminated simultaneously during normal operation. In other cases, the multiple light sources may be illuminated in some sequence, during which a multiplicity of images are captured and recorded.

The sensor of the present invention also comprises an imaging system. The imaging system may contain a digital imager onto which the hand is imaged. The imager may comprise a silicon CMOS imager or a silicon CCD imager. Alternatively, the imager may comprise a photodiode array made of materials such as MCT, lead-salt, InSb, InGaAs, or a bolometer array, or other devices and materials that enable the capture of images corresponding to the desired illumination wavelengths. In addition to the imaging array, there may be one or more polarizers present in the imaging system and located such that the imager "views" the hand or a portion thereof through the polarizer. Such polarizers may be linear or circular polarizers. In some cases, the polarizer in the imaging system may be arranged such that it is substantially orthogonal or crossed relative to one or more polarizers present in the illumination system. In some cases, the imaging system polarizer may be arranged to be substantially parallel or the same orientation as the illumination polarizer.

In cases where the imaging system views the hand through a polarizer that is substantially crossed relative to the illumination polarizer, the resulting image tends to emphasize image features that lie below the surface of the skin. In cases where the imager views the hand through a polarizer that is substantially parallel to the illumination polarizer, the resulting image tends to emphasize image features that lie at or near the surface of the skin. In cases where either the illumination polarizer or image polarizer or both are omitted, the resulting image tends to contain effects from both surface and subsurface features. In some cases, it may be advantageous to collect and analyze images collected under different polarization conditions in addition to or instead of images taken with different illumination wavelengths. As used herein, "multispectral imaging" is meant to indicate image data that is collected under multiple optical conditions, which in some embodiments may include multiple wavelengths and multiple polarization conditions.

Further description of aspects of multispectral imaging are described in the following copending, commonly assigned applications, the entire disclosure of each of which is incorporated herein by reference for all purposes: U.S. Provisional Pat. Appl. No. 60/483,281, entitled "HYPERSPECTRAL FINGERPRINT READER," filed Jun. 27, 2003; U.S. Provisional Pat. No. 60/504,594, entitled "HYPERSPECTRAL FINGERPRINTING," filed Sep. 18, 2003; U.S. Provisional Pat. No. 60/552,662, entitled "OPTICAL SKIN SENSOR FOR BIOMETRICS," filed Mar. 10, 2004; U.S. Provisional Pat. Appl. No. 10/576,364, entitled "MULTISPECTRAL FINGER RECOGNITION," filed Jun. 1, 2004 by Robert K. Rowe; 60/600,867, entitled "MULTISPECTRAL IMAGING BIOMETRIC," filed Aug. 11, 2004; U.S. Prov. Pat. Appl. No. 60/610,802, entitled "FINGERPRINT SPOOF DETECTION USING MULTISPECTRAL IMAGING," filed Sep. 17, 2004; U.S. Prov. Pat. Appl. No. 60/654,354, entitled "SYSTEMS AND METHODS FOR MULTISPECTRAL FINGERPRINT SENSING," filed Feb. 18, 2005; U.S. Prov. Pat. Appl. No. 60/659,024, entitled "MULTISPECTRAL IMAGING OF THE FINGER FOR BIOMETRICS," filed Mar. 4, 2005; U.S. Prov. Pat. Appl. No. 60/675,776, entitled "MULTISPECTRAL BIOMETRIC SENSORS," filed Apr. 27, 2005; U.S. patent application Ser. No. 10/818,698, entitled "MULTISPECTRAL BIOMETRIC SENSOR," filed Apr. 5, 2004 by Robert K. Rowe et al.; U.S. patent application Ser. No. 11/437,388, entitled "MULTISPECTRAL BIOMETRIC SENSOR," filed May 18, 2006 by Robert K. Rowe et al. U.S. patent application Ser. No. 11/383,901, entitled "BIOMETRIC SENSOR," filed May 17, 2006 by Robert K. Rowe et al. U.S. patent application Ser. No. 11/177,817, entitled "LIVENESS SENSOR," filed Jul. 8, 2005 by Robert K. Rowe; U.S. patent application Ser. No. 11/115,100, entitled "MULTISPECTRAL IMAGING BIOMETRICS," filed Apr. 25, 2005; U.S. patent application Ser. No. 11/115,101, entitled "MULTISPECTRAL BIOMETRIC IMAGING," filed Apr. 25, 2005; U.S. patent application Ser. No. 11/115,075, entitled "MULTISPECTRAL LIVENESS DETERMINATION," filed Apr. 25,2005; U.S. patent application Ser. No. 11/015,732, entitled "COMBINED TOTAL-INTERNAL-REFLECTANCE AND TISSUE IMAGING SYSTEMS AND METHODS," filed Dec. 17, 2004 by Robert K. Rowe; U.S. patent application Ser. No. 11/379,945, entitled "MULTISPECTRAL BIOMETRIC SENSORS," filed Apr. 24, 2006 by Robert K. Rowe; and U.S. patent application Ser. No. 11/219,006, entitled "COMPARATIVE TEXTURE ANALYSIS OF TISSUE FOR BIOMETRIC SPOOF DETECTION," filed Sep. 1, 2005 by Robert K. Rowe.

In some cases, the digital imager may be a color imager capable of separating multiple wavelength bands. The use of such a color imager is particularly advantageous in cases that a broad-band illumination source is used or multiple, different narrow-band illumination sources are turned on simultaneously. In such cases, information from multiple illumination conditions may be collected simultaneously, reducing the time and/or data volume requirements of an equivalent sequential series of monochromatic images. In some cases the color imager may be obtained by combining a digital imager with broad wavelength response with a color filter array that provides a narrower wavelength response to each imager pixel. In some cases the color filter array may contain three different color-selective filters (red, green and blue) in a Bayer pattern as known to one familiar in the art. Other variations of a color filter array as well as other means of color separation may also be advantageously employed.

Both the illumination and imaging systems may include other optical components such as lens, mirrors, phase plates, shutters, diffusers, band-pass optical filters, short-pass optical filters, long-pass optical filters, and the like in order to direct, control and focus light in a manner known to one familiar in the art.

In addition to the illumination and imaging subsystems, there may be a platen on which the hand is placed for imaging. Alternatively, the platen may be omitted and the hand imaged in free space.

In one embodiment of the present invention, the light sources are white-light LEDs. There may be two banks of LEDs: one with a linear polarizer present and one without a polarizer. Both banks of LEDs illuminate a platen through diffusers, lenses and/or mirrors to achieve moderately consistent illumination over the platen area. The platen may be a plane glass plate. The imager is a color silicon CMOS or CCD imager. Lenses and/or mirrors are used to image the top surface of the platen onto the imager. A short-pass filter is placed in the imaging system to significantly reduce the sensitivity of the imager to infrared light. A linear polarizer is placed in the imaging system such that it is substantially orthogonal to the polarizer present in one of the illumination banks. The imaging system and number of pixels is designed to be able to image at a resolution of between 100 and 2,000 pixels per inch (PPI). In one embodiment the imaging system is designed to image the hand with a resolution of approximately 500 PPI. A series of two images are collected: one with the non-polarized white light illuminating the hand and one with the cross-polarized light illuminating the hand. Optionally, a third image may be collected with all illumination LED's turned off, resulting in an image that represents the effect of ambient light. In some cases, the ambient-light image (or some grey-level scaled version of it) may be subtracted from one or both of the illuminated images to produce an estimate of corresponding images in which no ambient light is present.

By using multispectral imaging, the present sensor is able to measure some of the optical properties that result from the complexity of skin. These properties manifest themselves as characteristic features in both the spatial (image) and spectral components of the multispectral data. That is, images taken under different illumination conditions manifest different characteristics. For example, an image of skin taken with green light under crossed-polarization conditions is greatly affected by the cutaneous blood and typically shows a "splotchy" appearance. Red illumination of the same site shows a much more uniform set of image characteristics. A mathematically rigorous description of the spatial and spectral characteristics of skin when measured with a multispectral imager is referred to as chromatic texture.

One method of processing the multispectral image data employs chromatic textural descriptors to provide a strong form of spoof detection. Specifically, data analysis techniques are applied to the multispectral data to determine "typical" chromatic textural properties of living human skin. The whole-hand sensor compares the properties of every sample that is measured to the expected properties for skin and report a spoof attempt if the properties are out of the expected range. In so doing, the biometric sensor is able to guard against even the case of a brand new class of spoof by checking for consistency of the data with humans rather than characteristics of any particular type of spoof sample.

Although the chromatic textural properties of human skin are sufficiently similar across humans to describe them as a single group as we do in spoof detection, the inventors have also observed that the same properties are distinctly and repeatedly different between different people. It is this difference that allows the chromatic texture to be used as an additional source of biometric signal in the present invention. The chromatic textural properties of the skin at various sites on the hand are extracted and used to perform a match against those same properties collected on the authorized user of record. Such comparisons provide additional biometric information that is complimentary to the biometric information generated from hand and finger shape, each of the thumb- and fingerprints, and the palmprint.

Figure 3:
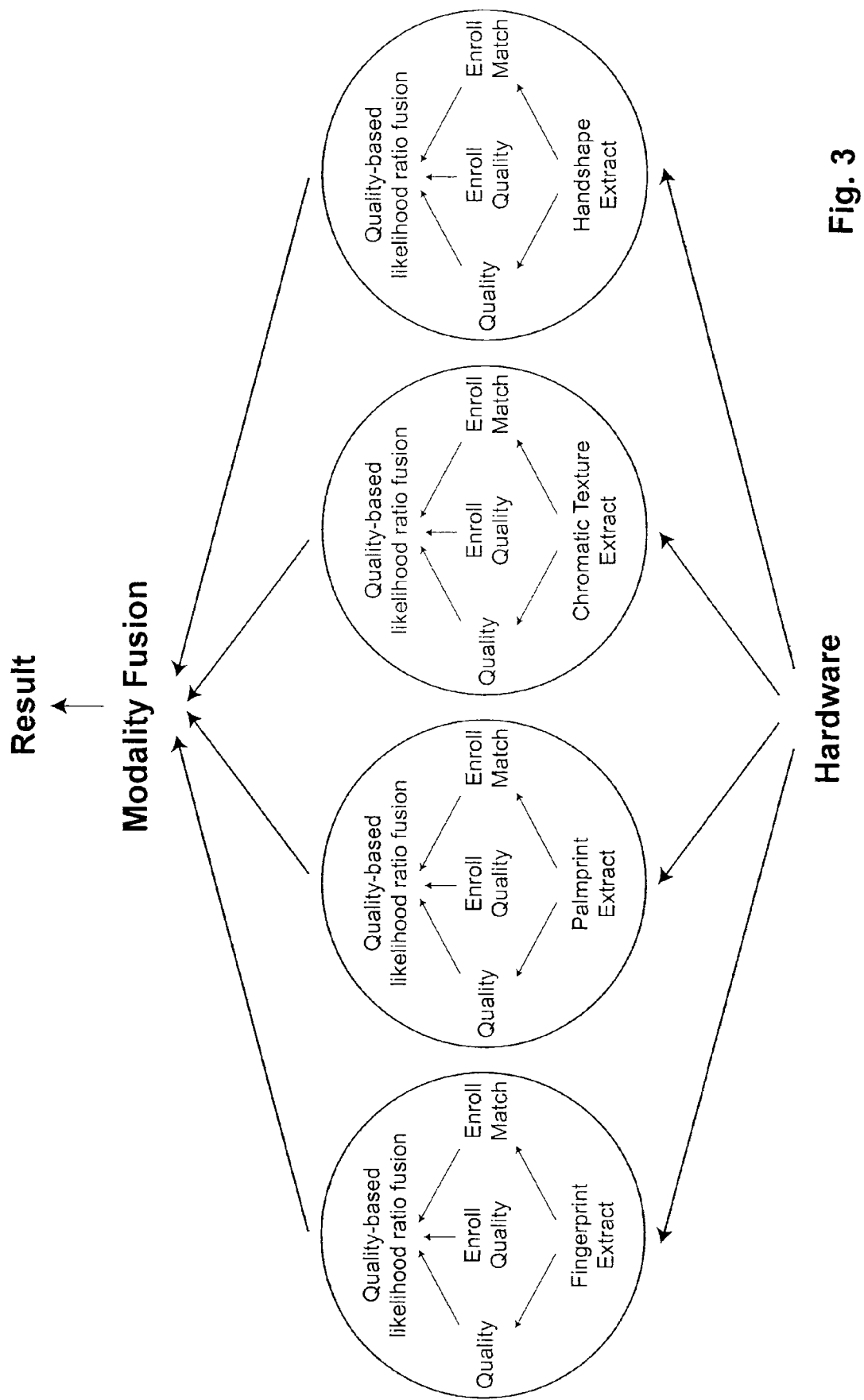
FIG. 3 illustrates whole-hand biometric fusion based on image quality.

Methods of combining or fusing the information from the multiple biometrics provided by the present invention include combining (or not separating) the raw data, combining the individual biometric features, combining the individual match scores, combining the biometric rankings, or combining the individual biometric matching decisions. Such methods of biometric fusion are known to one of familiarity in the art. One such method of combining the information is based on image quality and is illustrated in FIG. 3. In this illustration, extracted fingerprints 304, an extracted palmprint 308, chromatic texture 312, and/or an extracted handshape 316 may be fused.

Figure 4:
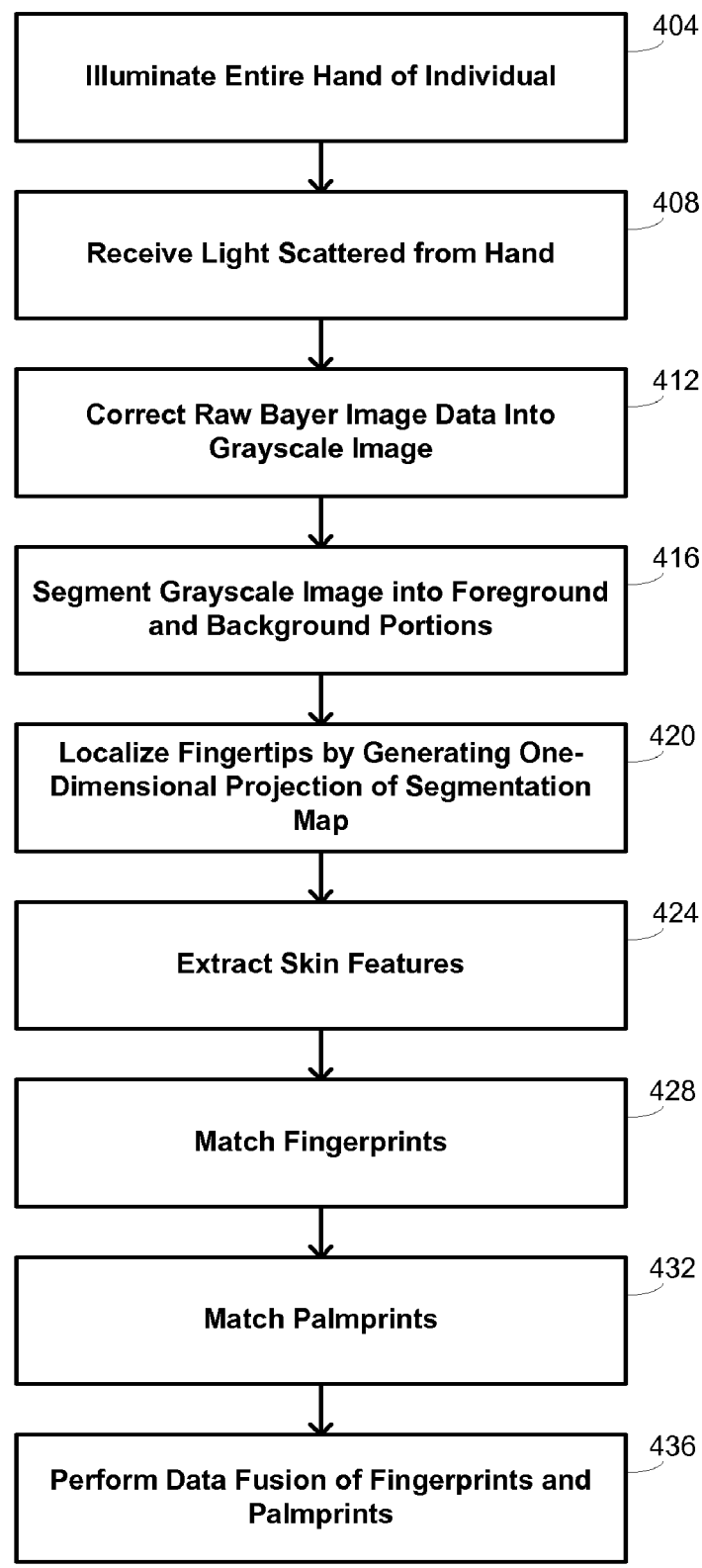
FIG. 4 is a flow diagram summarizing methods of performing biometric functions in an exemplary embodiment of the invention.

An overview of methods of performing a biometric function in accordance with embodiments of the invention is accordingly provided with the flow diagram of FIG. 4. At block 404, the entire hand of an individual is illuminated. Light scattered from the hand is received at block 408. The raw Bayer image data thus collected may be converted into a grayscale image at block 412, permitting the image to be segmented into foreground and background portions at block 416. The segmented image may then be used to localize fingerprints at block 420 by generating a one-dimensional projection of the segmentation map. The resulting data may be used at block 424 to extract skin features, allowing fingerprints to be match at block 428 and palmprints to be matched at block 432. The different sources of data may be fused at block 436, such as by combining fingerprint and palmprint information as indicated in the drawing.

Figure 5:
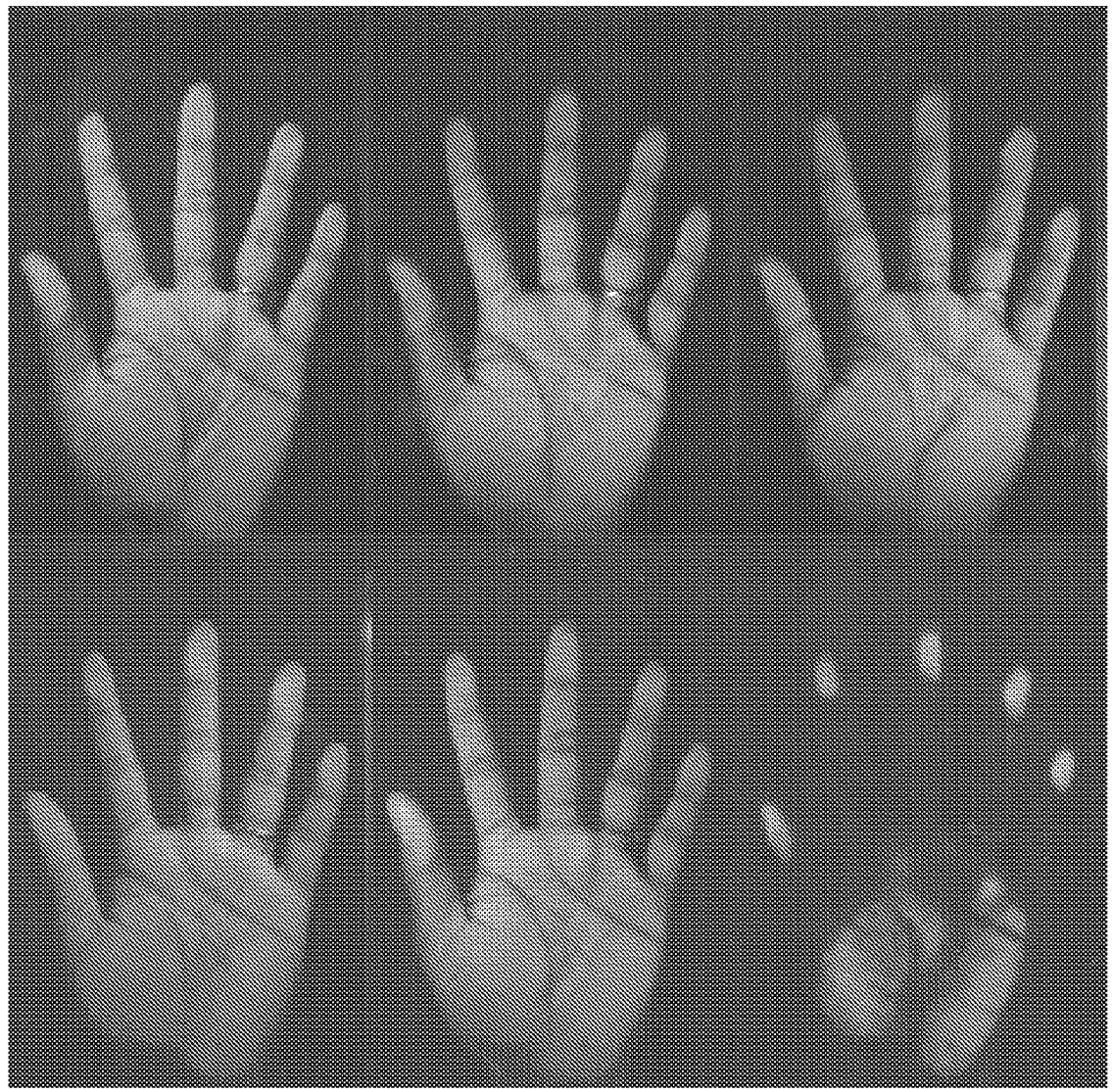
FIG. 5 shows raw multispectral whole-hand images collected using the imager of FIG. 1.

This general procedure is illustrated for a specific example with FIGS. 5-14. The initial preprocessing step at block 412 of FIG. 4 of converting the raw Bayer data may use a method based on local averages of the red-green-color plane components of the Bayer data to generate the grayscale image. In this approach, the original pixel values are adjusted by applying spatially varying scale factors that are derived from the ratio of the averages and a smoothed version of the original Bayer pattern. This directly converts the Bayer pattern to a single gray-scale image rather than aiming to restore the three color planes. FIG. 5 provides an example of raw multispectral whole-hand images. The three images in the top row as well as the lower-left image correspond to unpolarized illumination conditions. the lower middle image is generated with cross polarization, and the lower-right image is due to TIR illumination.

Figure 6:
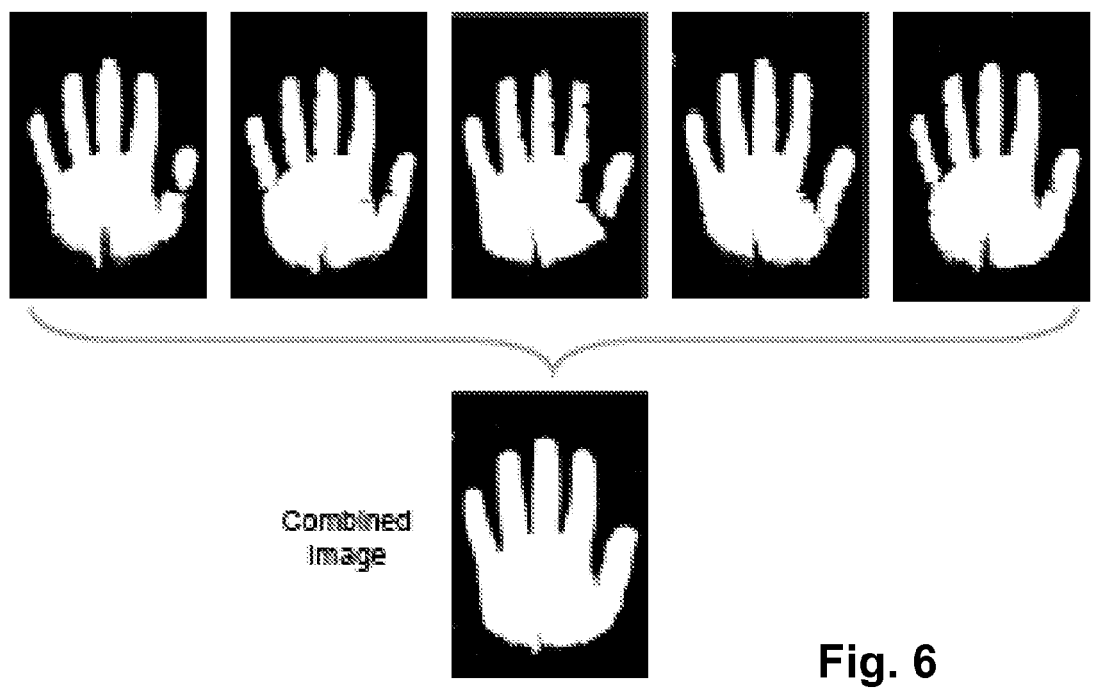
FIG. 6 illustrates segmentation of individual whole-hand images.

Segmentation of the grayscale image into foreground and background portions at block 416 may aid in identifying the shape and region occupied by the hand. FIG. 6 provides a schematic illustration of the process of performing segmentation on the five direct-illumination raw images of FIG. 5 and then combining the resulting segmentations into a single overall segmentation.

Figure 7:
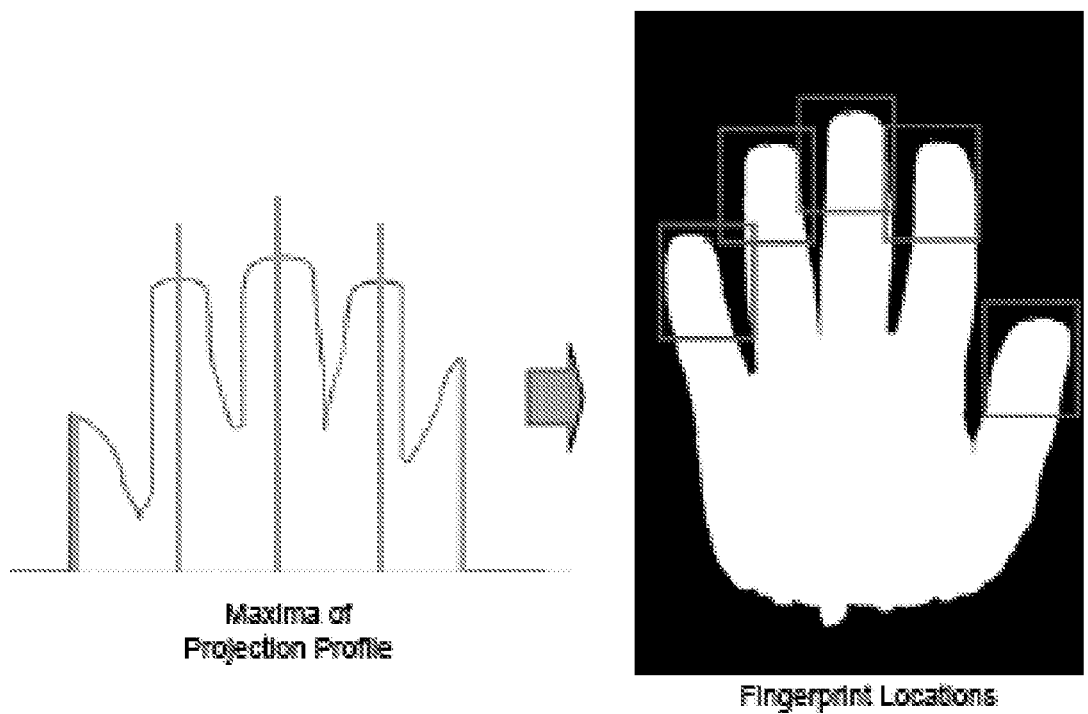
FIG. 7 illustrates a method of fingertip isolation used in embodiments of the invention.

Localization of fingertips is illustrated in FIG. 7. As noted in connection with block 420 of FIG. 4, fingertip localization may be performed by generating a one-dimensional projection of the segmentation map, which is then interrogated to determine points of local maxima. These points correspond to the fingertip locations along one axis. The position of the fingertip in the orthogonal axis is determined by looking for the transition point in the two-dimensional segmentation map at each of the local maxima locations in the one-dimensional projection. The resulting Cartesian coordinates may then be used to locate a fixed-sized region that localizes the fingertips as illustrated in FIG. 7.

Some of the sources of biometric signal such as fingerprints and palmprints are best represented by a single processed image generated from the MS data rather than by the raw images directly. A method for generating such composite images is based on a modification of the wavelet decomposition technique described in U.S. patent application Ser. No. 11/458,607, entitled "WHITE-LIGHT SPECTRAL BIOMETRIC SENSORS," filed Jul. 19, 2006 by Robert K. Rowe et al and U.S. patent application Ser. No. 11/458,619, entitled "TEXTURE-BIOMETRICS SENSOR," filed Jul. 19, 2006 by Robert K. Rowe, the entire disclosure of each of which is incorporated herein by reference for all purposes. The results of generating the composite image are illustrated in FIGS. 8A-8C and in FIGS. 9A-9C. For example FIG. 8C shows a fingerprint image extracted from the MSI data comprising directly illuminated raw images as shown in FIG. 8A and a TIR image as shown in FIG. 8B. The minutiae maybe identified by the commercially available NEC fingerprint extraction software. FIG. 9C shows a similarly derived metacarpal skin feature extracted from the MSI data shown in FIG. 9A and the TIR data shown in FIG. 9B. It is noted that embodiments of the invention successfully extract high-quality features even in regions where conventional TIR images contain little or no information.

The inventors conducted an investigation to ensure that useable biometric information could be extracted and matched from such features. A small data set was collected on ten volunteers over two study days. During each visit that volunteer made, three MSI datasets were collected for both the left and right hands. This resulted in 120 MSI datasets corresponding to twenty unique hands.

Figure 10:
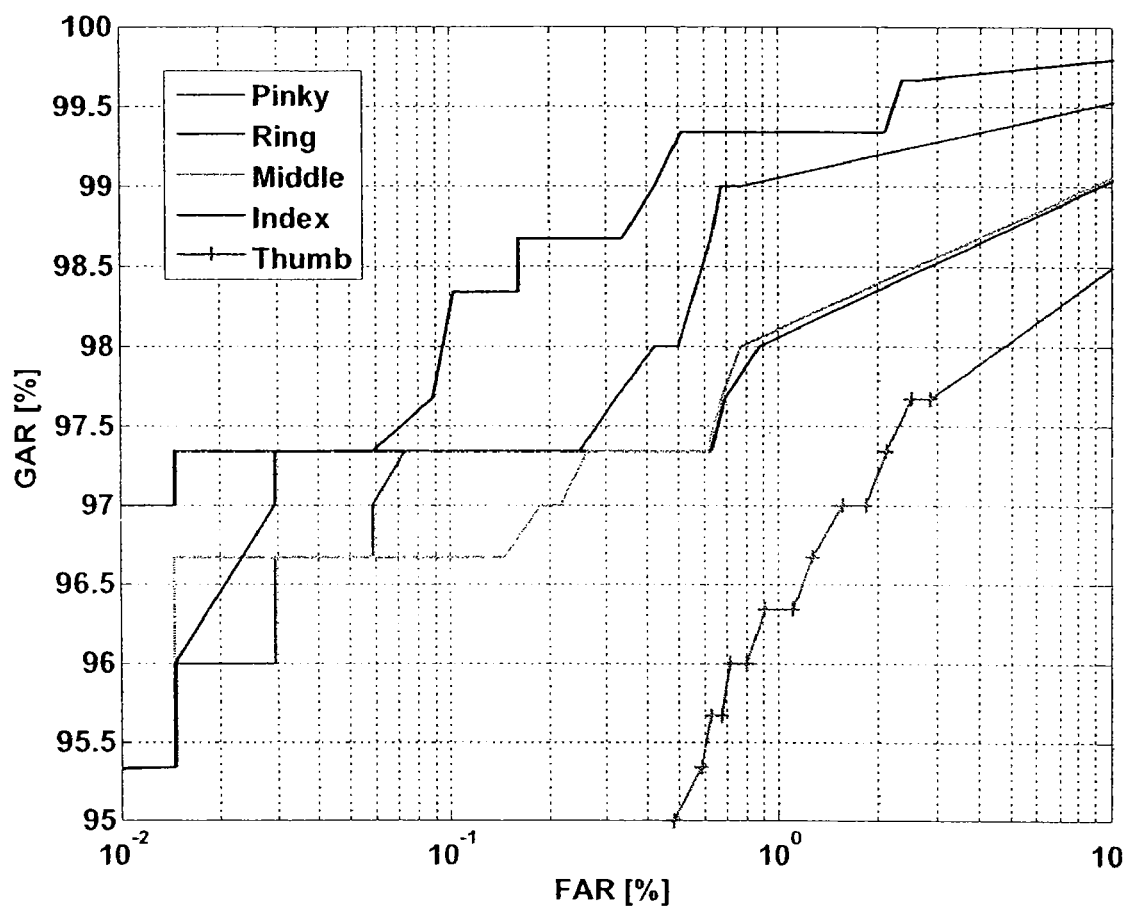
FIG. 10 compares receiver operating characteristic ("ROC") curves for different fingertips in one implementation of the invention.

Fingerprint matching at block 428 of FIG. 4 was performed for the datasets, with each of the five fingerprint regions on each of the 120 composite images generated from the study being manually identified, and the fingerprints extracted. Each the 600 resulting fingerprint images was then processed with a commercial feature extractor (NET PID) to identify and record a minutiae template. This algorithm is shown to be extremely accurate by several sources. The generated templates were then matched to each of the other corresponding images in the dataset. FIG. 10 shows five ROC curves for the pinky 1004, the ring finger 1008, the middle finger 1012, the index finger 1016, and the thumb 1020. As seen in this drawing, index finger results in the best performance for a large section of the ROC. The performance of the thumb is degraded relative to that of the other fingers since the system captures only a partial thumbprint due to the hand placement geometry on the platen.

A simple method of multibiometric fusion was applied by summing the scores from all the five fingerprint matches corresponding to each pair of images. This resulted in a perfect separation of genuine and imposter matches on this dataset.

Palmprints have a long history in forensics, but they have only recently been recognized as a viable and useful biometric in civilian applications. unlike palmprint identification systems used in forensics, the systems used in access-control types of applications can work effectively with low-resolution palmprint images (~100 ppi). According to the features used for palmprint representation, it is possible to categorize the various palmprint identification methods into three categories: structural feature-based, appearance-based, and texture-based. One palmprint-matching approach seeks to compare two line-like image regions and to generate one-bit feature code representing the outcome of the comparison (at each image location). One of the advantages of using this approach is that even if the image intensities vary due to such factors as nonuniform illumination, the ordinal relationship among the neighborhood regions in the image maintains some stability.

The palmprint preprocessing stage may enhance the image contrast and binarize the grayscale image. A single binary hand image may be obtained by using a voting scheme for each pixel in individual binarized band images. Morphological operators then remove the noise in the background and fill in the holes in the hand region, producing a binary image of the hand. This binary image helps in removing the thumb region since it is not of interest at this phase. The mean radial distance from the points on the hand contour to the hand centroid is computed; the points with the minimum mean radial distance are selected as the anchor points.

Figure 11:
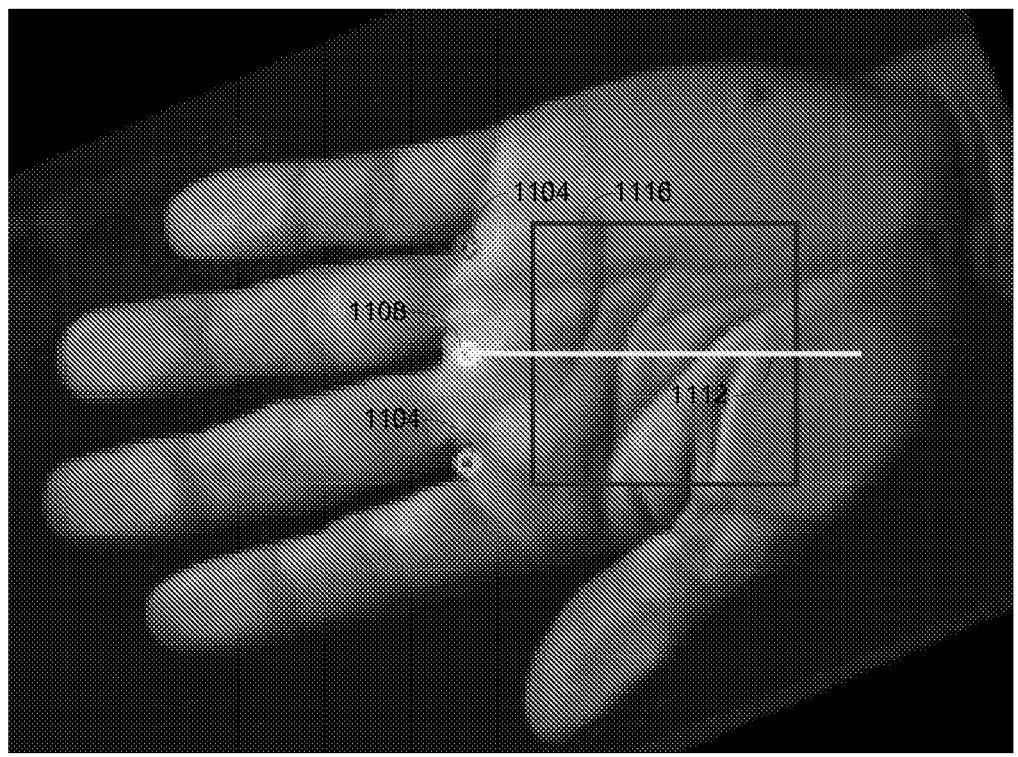
FIG. 11 illustrates the region of interest ("ROI") in a rotated hand image, as well as anchor points and an anchor midpoint.

The anchor points help in alignment of hand image. The origin of the coordinate system, after the alignment, is defined to be the midpoint of two interfinger anchor points: the point between the index and middle finger and the point between the middle and pinky finger. The slope of the line a passing through the anchor points is determined and each band image is rotated in the direction of α around the anchor midpoint. these two anchor points were automatically extracted in 118 out of the 120 total hand images. The anchor points also aid in extracting a region of interest. In one embodiment, the ROI is the 1000×1000 region that lies on the horizontal line passing through the midpoint of each band image. These features are illustrated in FIG. 11, which shows the two anchor points 1104, the anchor midpoint 1108, the horizontal line 1112, and the ROI 1116 for a particular embodiment.

Figure 12A:
FIG. 12A shows the original ROI in one implementation of the invention.
Figure 12B:
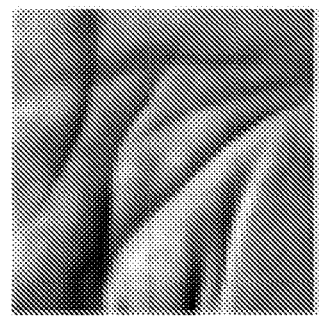
FIG. 12B shows a down-sampled ROI corresponding to the original ROI of FIG. 12A.

To extract palmprint features, each ROI may be filtered with an orthogonal line ordinal filter $$OF(\theta) = f(x, y, \theta) - f(x, y, \theta + \pi/2),$$

where $f$ is the two-dimensional Gaussian function with orientation $\theta$. For purposes of illustration, three filters were applied with values of $\theta$ equal to 0, $\pi/6$, and $\pi/3$, with the horizontal and vertical scales of the Gaussian filter $\delta_x$ and $\delta_y$ being set to 0.5 and 0.1 respectively. The filtered images were quantized to binary images according to the sign of the filter response at each pixel. FIG. 12A shows the original ROI and FIG. 12B shows a 256×256 downsampled ROI actually used. FIG. 13A shows ordinal feature vectors for $\theta=0$; FIG. 13B shows ordinal feature vectors for $\theta=\pi/6$; and FIG. 13C shows ordinal feature vectors for $\theta=\pi/3$.

Matching of two palmprints is done separately for each band. A dissimilarity score for each band is obtained by averaging the normalized Hamming distances of the three corresponding feature vectors. To minimize the alignment related problems, the features are translated vertically and horizontally in the range of [−5, 5] pixels; the minimum distance score obtained from the translated images is considered to be the final score for that specific band. The five distance scores, i.e., one for each band, that result for each palmprint pair permit various score-level fusion methods to be applied; for the specific embodiment discussed herein, the sum rule provided the best performance of 93% GAR at an FAR of 0.01%.

To demonstrate fusion of information from different biometric modalities, match scores were fussed from the index finger to the scores generated by the palms; other fusions may be used in alternative embodiments. Score-level fusion of fingerprint and palmprint was achieved by employing the sum-rule based method. Before summing the scores, the palmprint match scores were converted from distance to similarity by multiplying by −1. both fingerprint and palmprint match scores were normalized to the scale of [0, 1] by using min-max normalization techniques. The resulting ROC curves corresponding to the individual finger and palm biometrics as well as the fused result are shown in FIG. 14. Curve 1404 shows the results for the index fingerprint; curve 1408 shows the results for the palmprint; and curve 1412 shows the results for the fusion of the two. Fusing the information from a single fingerprint an a palmprint results in match performance that clearly exceeds that of either of the individual biometrics.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of performing a biometric function, the method comprising:
   illuminating a skin site of an individual;
   receiving light scattered from the skin site under multispectral conditions, the light including light scattered from tissue beneath a surface of the skin site;
   deriving a plurality of biometric modalities from the received light, wherein at least two of the biometric modalities represent different portions of the skin site;
   fusing the plurality of biometric modalities into a combined biometric modality; and
   analyzing the combined biometric modality to perform the biometric function.

2. The method recited in claim 1 wherein the skin site comprises a hand of the individual.

3. The method recited in claim 2 wherein the skin site comprises a palm of the hand and at least one fingertip of the hand.

4. The method recited in claim 2 wherein at least one of the biometric modalities comprises a palmprint of the hand.

5. The method recited in claim 2 wherein at least one of the biometric modalities comprises a fingerprint of a finger of the hand.

6. The method recited in claim 2 wherein at least one of the biometric modalities comprises a shape of the hand.

7. The method recited in claim 2 wherein at least one of the biometric modalities comprises a chromatic texture of the hand.

8. The method recited in claim 2 wherein deriving the plurality of biometric modalities comprises:
   converting raw color image data into a grayscale image;
   segmenting the grayscale image into foreground and background portions; and
   localizing a fingertip of the hand by generating a one-dimensional projection of the segmented grayscale image.

9. The method recited in claim 1 wherein illuminating the skin site and receiving light scattered from the skin site are performed while the skin site is in at least partial contact with a platen.

10. The method recited in claim 1 wherein analyzing the combined biometric modality comprises analyzing the combined biometric modality to determine an identity of the individual or to verify the identity of the individual.

11. The method recited in claim 1 wherein analyzing the combined biometric modality comprises analyzing the combined biometric modality to verify that the skin site is living tissue.

12. The method recited in claim 1 wherein analyzing the combined biometric modality comprises analyzing the combined biometric modality to estimate a demographic or anthropometric characteristic of the individual.

13. The method recited in claim 1 wherein:
   illuminating the skin site comprises polarizing incident light with a first polarization;
   receiving light scattered from the skin site comprises polarizing received light with a second polarization;
   the first and second polarizations are substantially crossed relative to each other.

14. A biometric sensor comprising:
   an illumination subsystem disposed to illuminate a skin site of an individual;
   a detection subsystem disposed to receive light scattered from the skin site under multispectral conditions, the light including light scattered from tissue beneath a surface of the skin site; and
   a computational unit interfaced with the detection subsystem and having:
      instructions for deriving a plurality of biometric modalities from the received light, wherein at least two of the biometric modalities represent different portions of the skin site;
      instructions for fusing the plurality of biometric modalities into a combined biometric modality; and
      instructions for analyzing the combined biometric modality to perform a biometric function.

15. The method recited in claim 14 wherein the skin site comprises a hand of the individual.

16. The method recited in claim 15 wherein the skin comprises a palm of the hand and at least one fingertip of the hand.

17. The biometric sensor recited in claim 15 wherein at least one of the biometric modalities comprises a palmprint of the hand.

18. The biometric sensor recited in claim 15 wherein at least one of the biometric modalities comprises a fingerprint of a finger of the hand.

19. The biometric sensor recited in claim 15 wherein at least one of the biometric modalities comprises a shape of the hand.

20. The biometric sensor recited in claim 15 wherein at least one of the biometric modalities comprises a chromatic texture of the hand.

21. The biometric sensor recited in claim 15 wherein the instructions for deriving the plurality of biometric modalities comprise:
- instructions for converting raw color image data into a grayscale image;
- instructions for segmenting the grayscale image into foreground and background portions; and
- instructions for localizing a fingertip of the by generating a one-dimensional projection of the segmented grayscale image.

22. The biometric sensor recited in claim 14 further comprising a platen in contact with the skin site.

23. The biometric sensor recited in claim 14 wherein the instructions for analyzing the combined biometric modality comprise instructions for analyzing the combined biometric modality to determine an identity of the individual or to verify the identity of the individual.

24. The biometric sensor recited in claim 14 wherein the instructions for analyzing the combined biometric modality comprise instructions for analyzing the combined biometric modality to verify that the skin site is living tissue.

25. The biometric sensor recited in claim 14 wherein the instructions for analyzing the combined biometric modality comprise instructions for analyzing the combined biometric modality to estimate a demographic or anthropometric characteristic of the individual.

26. The biometric sensor recited in claim 14 further comprising:
- a first polarizer disposed to polarize light incident on the skin site with a first polarization;
- a second polarizer disposed to polarize light scattered from the skin site with a second polarization,
- wherein the first and second polarizations are substantially crossed relative to each other.

27. The method recited in claim 1 wherein the different portions of the skin site overlap.

28. The biometric sensor recited in claim 14 wherein the different portions of the skin site overlap.

* * * * *